United States Patent [19]

Takahashi et al.

[11] Patent Number: 4,594,982
[45] Date of Patent: Jun. 17, 1986

[54] IGNITION TIMING CONTROL APPARATUS FOR INTERNAL COMBUSTION ENGINE

[75] Inventors: Akira Takahashi; Yoshiaki Danno, both of Kyoto; Toshio Iwata; Atsushi Ueda, both of Himeji, all of Japan

[73] Assignee: Mitsubishi Denki Kabushiki Kaisha, Tokyo, Japan

[21] Appl. No.: 670,219

[22] Filed: Nov. 13, 1984

[30] Foreign Application Priority Data

Nov. 14, 1983 [JP] Japan .................................. 58-213822
Nov. 14, 1983 [JP] Japan .................................. 58-213823
Feb. 2, 1984 [JP] Japan .................................. 59-18537

[51] Int. Cl.$^4$ ............................................. F02P 5/04
[52] U.S. Cl. ..................................... 123/425; 123/416
[58] Field of Search ............... 123/406, 415, 416, 417, 123/425, 435, 575

[56] References Cited

U.S. PATENT DOCUMENTS 3,822,583  7/1974  Keller et al. ........................... 73/35
4,463,565  8/1984  Rydquist et al. ................ 123/425 X

FOREIGN PATENT DOCUMENTS 27886   2/1983  Japan ................................. 123/425
138262  8/1983  Japan ................................. 123/425
143169  8/1983  Japan ................................. 123/425

Primary Examiner—Tony M. Argenbright
Attorney, Agent, or Firm—Leydig, Voit & Mayer, Ltd.

[57] ABSTRACT

An ignition timing control apparatus for an internal combustion engine capable of using as a fuel a regular (low-octane) gasoline, a premium (high-octane) gasoline, or a mixture of both type of gasolines. The engine produces knocks when the ignition timing is advanced beyond a reference ignition timing determined as a function of the type of gasoline being used. This advance ignition timing control apparatus detects the knocks, and provides as an output therefrom a signal according to the occurrence rate of the knocks which essentially indicates the type of gasoline in use. By means of this signal, this ignition timing control apparatus continuously displaces the reference ignition timing in the direction of retard angle by using a proportion factor calculator and an interpolator. At the same time, the displaced reference ignition timing is corrected by the detected knock signals on a real time basis. The combined ignition timing signal serves to energize an ignition coil to suppress the occurrence of knocks. This operation will continue until no knocks occur.

31 Claims, 67 Drawing Figures

IGNITION TIMING CONTROL APPARATUS FOR INTERNAL COMBUSTION ENGINE

BACKGROUND OF THE INVENTION

This invention relates to an ignition timing control apparatus for an internal combustion engine, and in particular to an ignition timing control apparatus for an internal combustion engine which is operable either with a low-octane rating fuel or a high-octane rating fuel.

It is well known in the art that the octane rating of fuel gasoline is greatly interrelated with a knock-resistibility in an internal combustion engine. Namely, as the octane rating of gasoline becomes higher, the knocking of an engine correspondingly decreases.

FIG. 1 shows an ignition timing vs output shaft torque characteristic in an internal combustion engine in the case where a commercially available low-octane gasoline (regular gasoline) and a commercially available high octane gasoline (premium gasoline) of which the octane rating is higher than that of the low-octane gasoline. In the figure, point A indicates a knock limit for the low-octane gasoline while point B indicates a knock limit for the high-octane gasoline, in which knock arises when the angle of the ignition timing is advanced beyond these points. According to FIG. 1, it is possible to advance the angle of the ignition timing up to a point B if the high-octane gasoline is used, where the output shaft torque will be higher as compared with the use of the low-octane gasoline.

FIG. 2 shows an ignition timing characteristic representing points A and B as a function of engine speed. It is seen that the interval between the characteristics A and B is constant as a function of the engine speed. Therefore, in an internal combustion engine with such a characteristic, it will be possible to increase the output of the engine by advancing the ignition timing by a predetermined angle if fuel used in the engine is changed over from the low-octane rating gasoline to the high-octane rating gasoline.

Also in the case where a mixed fuel of both gasolines is used for the engine, it will be possible to increase the output of the engine if the ignition timing is advanced in angle according to the mixture ratio of the fuel.

However, in a conventional ignition timing control apparatus for an internal combustion engine, the reference ignition timing characteristic is preset only for a predetermined gasoline, e.g. the low-octane rating gasoline. Therefore when using the high-octane rating gasoline, an increase in the output of the engine can not be expected without any change or modification thereof, so that the presetting of the reference ignition timing must be repeated towards the advance angle by some method.

Particularly, such a repeated presetting of the reference ignition timing is very hard when using the mixed fuel because, as shown in FIG. 2 by a dotted curve C, the knock limit exists between curves A and B according to the mixture ratio and so the possible advance limit is varied.

Even if the reference ignition timing has been again preset at the knock limits A and B, since the knock limits A and B in FIG. 1 may vary with environmental conditions during the operation of the engine such as temperature, humidity, etc, knocks easily arise at the time of transient operation such as an accelerated operation of the engine, and accordingly it is quite difficult to avoid the occurrence of engine knocks.

U.S. Pat. No. 3,822,583, titled "Method for Determining Octane Ratings of Fuels under Road Conditions" issued on July 9, 1974 to B. D. Keller et al. discloses an ignition timing control according to the octane rating of gasoline by a knock detection.

SUMMARY OF THE INVENTION

It is a general object of the invention to provide an ignition timing control apparatus for an internal combustion engine wherein the occurrence of knocks is detected, and a reference ignition timing displacement magnitude indicating the mixture ratio of a high-octane rating fuel and a low-octane rating fuel is determined according to the detected value, on the basis of which the reference ignition timing is set in the advance angle or retard angle direction, whereby the mixture ratio is determined to continuously adjust the reference ignition timing to an optimum angle. At the same time, the occurrence of knock is immediately suppressed by controlling the ignition timing in the direction of retard angle on a real time basis when knock arises at the time of a rapid variation of an environmental condition during the steady state engine operation or at the time of a transient operation.

The present invention, broadly in one aspect, provides an ignition timing control apparatus for an internal combustion engine comprising: a sensing means for sensing knock signals of the engine; a knock signal deriving means responsive to the output of the sensing means, for deriving the knock signals; means for generating reference ignition timing signals; a correction magnitude determining means for determining an ignition timing correction magnitude for suppressing the occurrence of knock from the output of the knock signal deriving means; a displacement magnitude determining means for determining from the output of the knock signal deriving means or the output of the correction magnitude determining means a displacement magnitude for the reference ignition timing corresponding to the octane rating of a fuel used in the engine; and an ignition timing determining means responsive to the outputs of the correction magnitude determining means and the displacement magnitude determining means to determine an ignition timing of the engine.

Moreover, it is also possible to continuously control an ignition timing according to the detected value of knocks without a real time retard angle correction.

The present invention, broadly in another aspect, provides an ignition timing control apparatus for an internal combustion engine comprising: a sensing means for sensing knock signals of the engine; a knock signal deriving means responsive to the output of the sensing means, for deriving the knock signals; means for generating reference ignition timing signals; a displacement magnitude determining means for determining from the output of the knock signal deriving means or the output of the correction magnitude determining means a displacement magnitude for the reference ignition timing corresponding to the octane rating of a fuel used in the engine; and an ignition timing determining means responsive to the outputs of the displacement magnitude determining means to determine an ignition timing of the engine.

BRIEF DESCRIPTION OF THE DRAWINGS

Throughout the figures, the same reference numerals indicate identical or corresponding portions and element.

DETAILED DESCRIPTION OF THE PREFERRED EMBODIMENTS

The present invention will now be described in detail along the preferred embodiments illustrated in the accompanying drawings.

Figure 3:
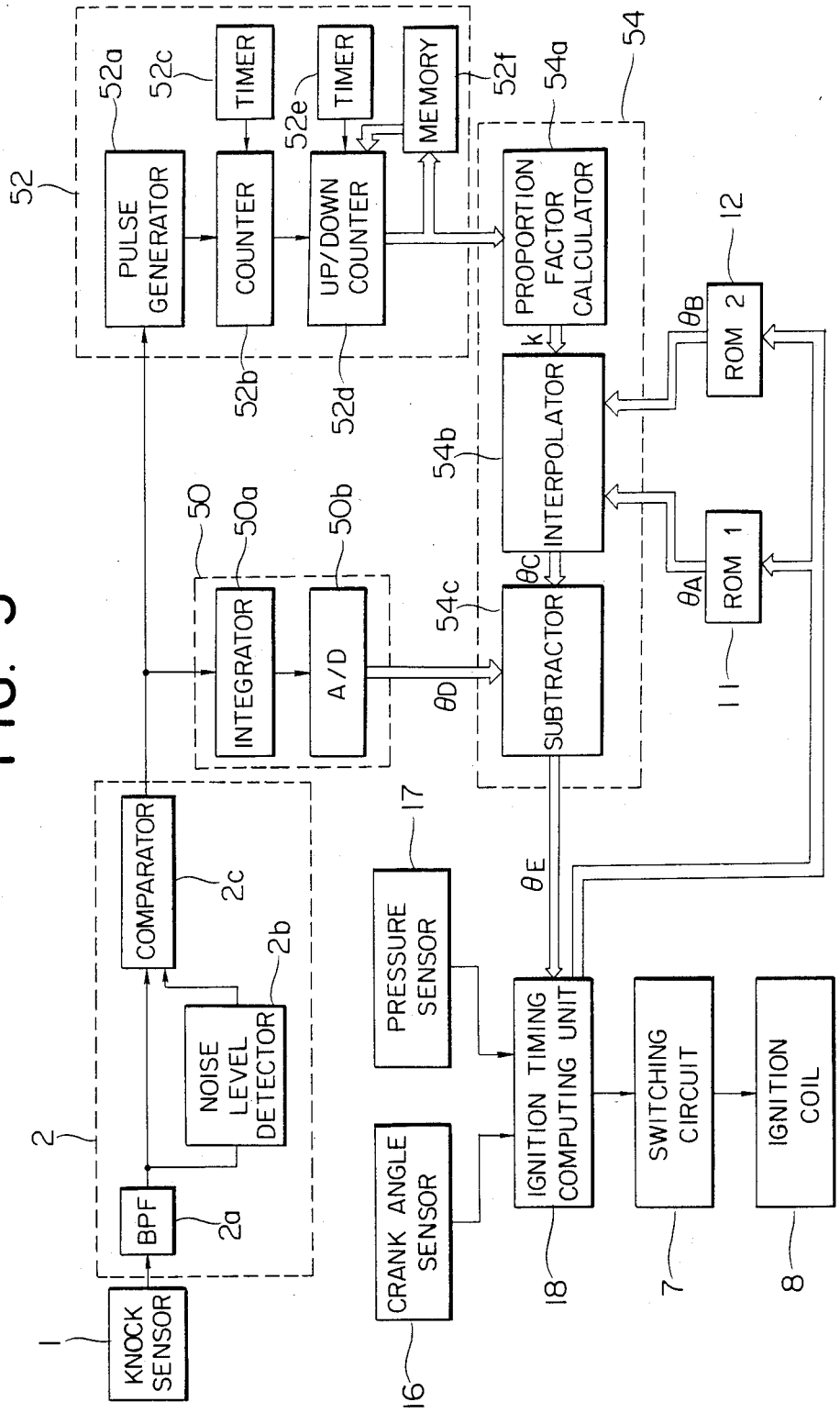
FIG. 3 shows a block diagram of a first embodiment of an ignition timing control apparatus for an internal combustion engine in accordance with this invention.

FIG. 3 shows a circuit diagram of a first embodiment of a continuous ignition timing control apparatus for an internal combustion engine in accordance with this invention. In the figure, a knock sensor 1 is mounted on an internal combustion engine (not shown) to sense knocks of the engine. The output signal of the knock sensor 1 is received by a knock signal deriving portion 2, enclosed with dotted lines, which is composed of a bandpass filter 2a, a noise level detector 2b, and a comparator 2c. The input of the bandpass filter 2a is connected to the knock sensor 1 and the output thereof is connected to the noise level detector 2b and one input of the comparator 2c. The output of the noise level detector 2b is connected to the other input of the comparator 2c.

The comparator 2c of the knock signal deriving portion 2 is connected to a retard angle control magnitude determining portion 50 and a reference ignition timing displacement magnitude determining portion 52. The retard angle control magnitude determining portion 50 includes an integrator 50a and an analog to digital (A/D) converter 50b. This retard angle control magnitude determining portion 50 serves as means for determining an ignition timing correction magnitude to suppress the occurrence of knocks of the engine according to the output of the portion 2, as described hereinafter. The reference ignition timing displacement magnitude determining portion 52 is formed of a pulse generator 52a, a counter 52b, a timer 52c, an up/down counter 52d, a timer 52e, and a memory 52f. The input of the pulse generator 52a is connected to the output of the comparator 2c and the output thereof is connected to the input of the counter 52b. The timer 52c is connected to the reset input of the counter 52b. The up-count input of the up/down counter 52d is connected to the output of the counter 52b and the down-count input thereof is connected to the timer 52e. The data input of the memory 52f is connected to the output of the up/down counter 52d and the data output thereof is connected to the preset input of the up/down counter 52d.

A first ignition timing computing unit 54 is formed of a proportion factor calculator 54a, an interpolator 54b, and a subtractor 54c. The proportion factor calculator 54a is connected to the output of the up/down counter 52d to convert the count of the up/down counter 52d into a proportion factor. The interpolator 54b is connected to the output of ROM's 11 and 12 as well as the output of the calculator 54a so that an interpolation is performed according to the proportion factor provided from the calculator 54a between the output data of the ROMs' 11 and 12s, thereby providing as an output an ignition timing data determined by the interpolation. The subtractor 54c has two inputs, one of which is connected to the output of the interpolator 54b and the other of which is connected to the output of the A/D converter 50b, and subtracts the output value of the A/D converter 50b from the ignition timing data from the interpolator 54b to provide an ignition timing data output, which is shifted in the retard direction, to a second ignition timing computing unit 18.

The ROM's 11 and 12 which are first and second ignition timing characteristic memory portions have stored therein ignition timing data at corresponding memory addresses determined by an engine speed and a load condition as illustrated in FIGS. 4(A) and 4(B). FIG. 4(A) shows data of the ROM 11 set for the low-octane gasoline while FIG. 4(B) shows data of the ROM 12, set for the high-octane gasoline, positioned in the side of advance angle in relation to FIG. 4(A).

A crank angle sensor 16 detects the crank rotational angle of the engine, and a pressure sensor 17 detects intake air pressure of the engine. The above noted ignition timing computing unit 18 computes the engine speed from the output signal of the crank angle sensor 16, determines the load condition of the engine from the output signal of the pressure sensor 17, and converts the value determined by the engine speed and the load condition into an address value, which is sent to the ROM's 11 and 12. The ignition timing computing unit 18 also reads out the output data of the subtractor 54c, computes the ignition timing from the output data of the subtractor 54c on the basis of the output signal of the crank angle sensor 16, and sends the ignition signal to a switching circuit 7 and then an ignition coil 8. The switching circuit 7 energizes or deenergizes an ignition coil 8 in synchronization with the output signal of the computing unit 18 to produce a high voltage necessary for the ignition of the engine.

Figure 5:
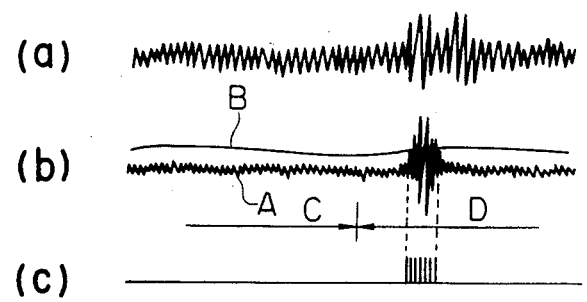
FIGS. 5a-c show waveform graphs for explaining the operation of the knock signal deriving portion in FIG. 3.
Figure 6:
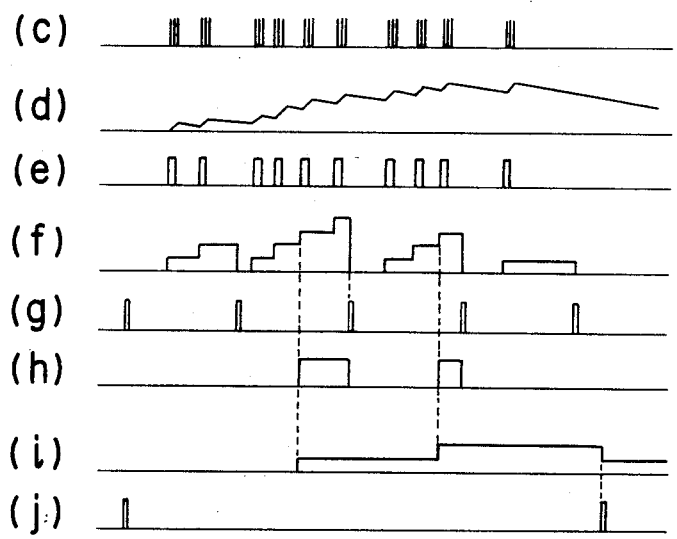
FIGS. 6c-j show waveform diagrams taken out of the various places of the retard angle control magnitude determining portion and the reference ignition timing displacement magnitude determining portion shown in FIG. 3.

The operation of each of the block portions will now be described with reference to FIGS. 5 and 6. FIG. 5 shows waveforms indicating the operation of each of the circuits in the knock signal deriving portion 2, and FIG. 6 shows waveforms indicating the operation of each of the circuits in the portions 50 and 52.

The knock sensor 1 is a vibration acceleration sensor generally well known as being mounted on the cylinder block (not shown) etc., of an engine, which converts the mechanical vibration into an electrical signal, and generates a vibrating wave signal, as shown in FIG. 5(a), received by the bandpass filter 2a. The bandpass filter 2a only passes therethrough a frequency component inherent in knocks comprising a noise component and a knock component, from the output signal of the knock sensor 1, thereby suppressing a noise component not relating to knocks to provide an output good in S/N ratio as shown in FIG. 5(b) by wave-form A.

The noise level detector 2b may be composed of, e.g. a half-wave rectifying circuit, an averaging circuit, and an amplifying circuit etc. The noise level detector 2b converts the output of the bandpass filter 2a (FIG. 5(b), wave-form A) into a DC voltage by the half-wave rectification and the averaging operations, the DC voltage being amplified with a predetermined amplification to have a level, as shown in FIG. 5(b) by a wave-form B, higher than the noise component of the output signal of the bandpass filter 2a (FIG. 5(b), wave-form A) but lower than the knock component of the same.

The comparator 2c compares the output signal of the noise level detector 2b (FIG. 5(b), wave-form B) with the output of the bandpass filter 2a (FIG. 5(b), wave-form A). In the case where no knock occurs (FIG. 5, section C), since the output signal of the bandpass filter 2a (FIG. 5(b), wave-form A) is not greater than the output signal of the noise level detector 2b (FIG. 5(b), wave-form B), the comparator 2c provides no output, while in the case where knocks occur (FIG. 5(b), section D), since the former signal is greater than the latter signal, the comparator 2c provides as an output a pulse train as shown in FIG. 5(c). Accordingly, the output pulse train from the comparator 2c can be used for determining whether or not knocks have occurred.

When the knock signal deriving portion 2 derives knock signals as shown in FIG. 5(c), the comparator 2c provides as an output a pulse train as shown in FIG. 6(c). As shown in FIG. 6(d), this pulse train causes the output of the integrator 50a to be increased to retard the angle of the ignition timing, thereby suppressing the occurrence of knocks on a real time basis. On the other hand, when knock ceases, the output voltage of the integrator 50a decreases to return the ignition timing to the last advance angle.

Therefore, the retard angle control magnitude determining portion 50, as shown in FIG. 6(d) by the output of the integrator 50a, forms a closed loop control system for retarding the angle of the ignition timing up to the knock limit point on a real time basis in response to the occurrence of knocks. While the rising rate or the falling rate of the output voltage of the integrator 50a is dependent upon the responsiveness in retard angle or the stability of the closed loop control, it is set at a relatively high responsiveness because of the requirements of immediate response to knocks.

The displacement magnitude determining portion 52 serves to determine a displacement magnitude for the reference ignition timing according to the occurrence rate of knocks. The pulse generator 52a receives as an input the pulse train output (FIG. 6(c)) from the comparator 2c and then provides output pulses (FIG. 6(e)). That is to say, the pulse generator 52a provides one output pulse in response to a knock which occur during one ignition. The output pulses of the pulse generator 52a are counted by the counter 52b, the count value being shown in FIG. 6(f). The timer 52c provides one output pulse (FIG. 6(g)) per a predetermined time interval to the counter 52b whose count is reset to zero by the output pulse of the timer 52c. The output of the counter 52b becomes a logic high level when the count value of the counter 52b exceeds a predetermined value which is "count 3" in this case, as shown in FIG. 6(h). This means that when a predetermined number of knocks has occurred within a predetermined time interval, i.e. the occurrence rate of knocks has exceeded a predetermined value, the counter 52b provides a high level output signal.

The up/down counter 52d counts up by one when the output of the counter 52b has a logical transition from the low level "0" to the high level "1". The timer 52e provides one output pulse per a predetermined time interval as shown in FIG. 6(j) to the up/down counter 52d which is counted-down by one by the output of the timer 52e. The count of the up/down counter 52d is shown in FIG. 6(i).

The memory 52f stores the count of the up/down counter 52d at the time of the ignition switch being turned off or at the time of a reduction in the power source voltage, while presetting the stored count as the count of the up/down counter 52d. Namely, even if the engine is stopped, the memory 52f enables a displacement magnitude of the reference ignition timing to be retained.

Thus, the reference ignition timing displacement magnitude determining portion 52 determines the occurrence rate of knocks and then produces a displacement magnitude to retard the reference ignition timing by the output of the up/down counter 52d if the occurrence rate of knocks exceeds a predetermined value while the displacement magnitude is shifted toward the advance angle if the displacement magnitude is not shifted toward the retard angle within a predetermined time interval.

Therefore, the displacement magnitude determining portion 52, similar to the retard angle control magnitude determining portion 50, also forms a closed loop control system for retarding/advancing the ignition timing according to the occurrence of knocks, through the first and second ignition timing computing units 54 and 18. However, both portions are different in that the portion 50 controls the ignition timing in the direction of retard angle on a real time basis in order to suppress the occurrence of knocks by the detection thereof whereas the portion 52 operates according to the occurrence rate of knocks by the detection thereof and then displaces the reference ignition timing in the direction of retard angle or advance angle thereby to provide a reference ignition timing corresponding to the octane rating of a fuel used for the engine. Therefore, the responsiveness in displacement of the determining portion 52 toward the advance angle or the retard angle is set more slowly than that of the determining portion 50.

Now the first ignition timing computing unit 54 will be described.

Figure 2:
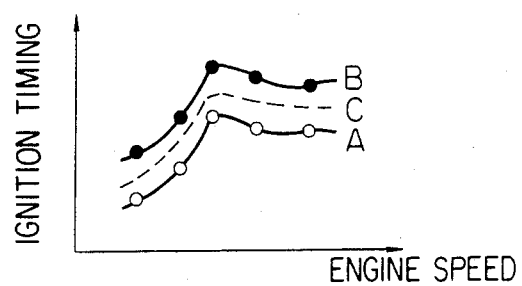
FIG. 2 shows an ignition timing characteristic as a function of engine speed.

The proportion factor calculator 54a changes the output count of the up/down counter 52d into a proportion factor. Assuming that the proportion factor calculator 54a receives as an input an output count N of the up/down counter 52d, this count N is divided by a maximum preset count value Nmax from the up/down counter 52d, the result being assumed to be a proportion factor k (=N/Nmax). Therefore, in the case where premium gasoline is used, the knock limit point is relatively positioned in the direction of advance angle, and accordingly the count N of the up/down counter 52d will be substantially zero so that the proportion factor k becomes equal to zero. On the other hand, in the case where regular gasoline is used, the knock limit point is relatively positioned in the direction of retard angle, and accordingly the count N of the up/down counter 52d will be substantially Nmax so that the proportion factor k becomes equal to 1. Further in the case where mixed gasoline of premium and regular gasolines is used, as shown in FIG. 2 by the characteristic curve C, the knock limit characteristic exists between those in the case where premium gasoline is used and in the case where regular gasoline is used so that the count N of the up/down counter 52d assumes a value between zero and Nmax, i.e. $0 < N < Nmax$, thereby $0 < k < 1$. Therefore, it can be seen that the proportion factor k indicates the mixture ratio of premium gasoline and regular gasoline.

Meanwhile, the ROMs' 11 and 12 receive as inputs an address value corresponding to the engine speed and the engine load from the second ignition timing computing unit 18 and then provides as an output the ignition timing data stored in that address to the interpolator 54b. Assuming that the ignition timing characteristic stored in the ROM 11 be set for premium gasoline and that the ignition timing data in that address be $O_{-B}$, and that the ignition timing characteristic stored in the ROM 12 be set for regular gasoline and that the ignition timing data in that address be $O_{-A}$, the ignition timing characteristic of the ROM 11 is set at the same timing as that of the ROM 12 or toward the advance angle beyond the latter so that $O_{-A} < O_{-B}$. Hence the interpolator 54b performs the interpolating operation according to the proportion factor k between $O_{-A}$ and $O_{-B}$. Namely, the operation of $O_{-B} - k(O_{-B} - O_{-A})$ is performed, the resultant value $O_{-C}$ as assumed, having a value divided proportionally by a ratio of $k:(1-k)$ between $O_{-B}$ and $O_{-A}$. Therefore, it will be found that when premium gasoline is used, $O_{-C} = O_{-B}$ because $k = 0$, when regular gasoline is used, $O_{-C} = O_{-A}$ because $k = 1$, and when a mixture of premium and regular gasolines is used, $O_{-A} < O_{-C} < O_{-B}$ because $0 < k < 1$. Therefore, $O_{-C}$ has a value proportionally divided between $O_{-A}$ and $O_{-B}$ on the basis of a proportion factor k indicating the mixture ratio of premium and regular gasolines so that even though a mixture of premium and regular gasolines is used, an optimum reference ignition timing can be provided according to the mixture ratio of premium high-octane gasoline and regular low-octane gasoline, by means of the above interpolation.

Furthermore, in the first ignition timing computing unit 54, the subtractor 54c subtracts from the output value $O_{-C}$ of the interpolator 54b the output value $O_{-D}$ of the A/D converter 50b in the retard angle control magnitude determining portion 50 to provide as an output therefrom the ignition timing data of $O_{-E}$ ($= O_{-C} - O_{-D}$) to the second ignition timing computing unit 18. Namely, the subtractor 54c performs a retard angle correction for the reference ignition timing by subtracting the retard angle control magnitude from the optimum reference ignition timing obtained by the interpolator 54b in order to suppress knocks occurring during a transient operation of the engine or at a time of rapid transition of the environmental condition.

Next, a second embodiment of this invention will now be described with reference to FIGS. 7 and 8.

Figure 7:
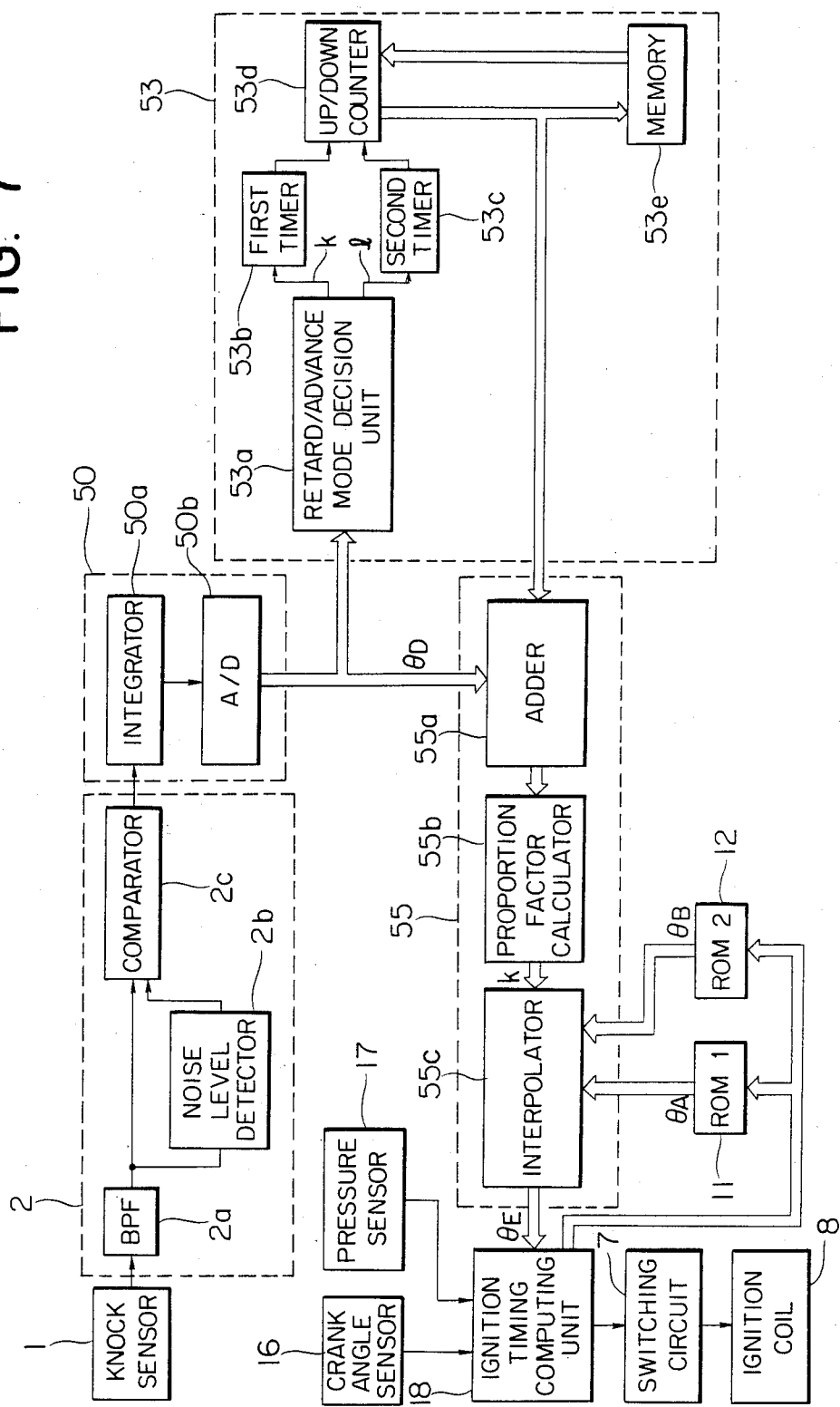
FIG. 7 shows a block diagram of an arrangement of a second embodiment of an ignition timing control apparatus for an internal combustion engine in accordance with this invention.

This second embodiment shown in FIG. 7 is different from the first embodiment only in the arrangement of the reference ignition timing displacement magnitude determining portion, in the arrangement of the first ignition timing computing unit, and in the connection of the retard angle control magnitude determining portion, the reference ignition timing displacement magnitude determining portion, and the first ignition timing computing unit. Therefore, the description of the portions or elements denoted by the same reference numerals in both embodiments will not be repeated.

In FIG. 7, the reference ignition timing displacement magnitude determining portion 53 is formed of a retard/advance mode decision unit 53a, a first timer 53b, a second timer 53c, an up/down counter 53d which may be the same as the up/down counter 52d, and a memory 53e which may be the same as the memory 52f; and the first ignition timing computing unit 55 is formed of an adder 55a, a proportion factor calculator 55b which may be the same as the calculator 54a, and an interpolator 55c which may be the same as the interpolator 54b.

The retard/advance mode decision unit 53a has one input terminal connected to the output terminal of the retard angle control magnitude determining portion 50 to receive the output of the A/D converter 50b and has two output terminals one of which is, as a retard mode output, connected to the first timer 53b and the other of which is, as an advance mode output, connected to the second timer 53c, thereby comparing the output value of the A/D converter 50b with a predetermined value and consequently providing the retard mode output or the advance mode output.

The output terminals of the timers 53b and 53c are respectively connected to the up-count input terminal and the down-count input terminal of the up/down counter 53d. The input terminal of the memory 53e is connected to the output terminal of the up/down counter 53d while the output terminal of the memory 53e is connected to the preset input terminal.

The adder 55a has two input terminals one of which is connected to the output terminal of the reference ignition timing displacement magnitude determining portion 53, namely, the output terminal of the up/down counter 53d and the other of which is connected to the output terminal of the retard angle control magnitude determining portion 50, namely, or the output terminal of the A/D converter 50b. The output terminal of the adder 55a is connected to the input terminal of the proportion factor calculator 55b. The interpolator 55c receives as inputs thereto output data of the ROMs' 11 and 12 as well as the output value of the proportion factor calculator 55b while providing as an output therefrom the calculated result to the second ignition timing computing unit 18.

It will be seen from FIGS. 3 and 7 that while in the first embodiment the output of the comparator 2c is connected to the inputs of the integrator 50 as well as the pulse generator 52a, in the second embodiment the output of the comparator is only connected to the input of the integrator 50a.

Figure 8:
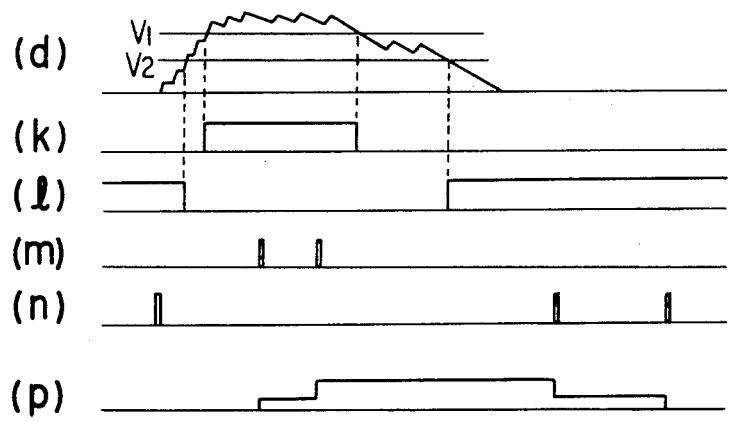
FIGS. 8d, 8k-n, and 8p show waveform diagrams taken out of the various places of the reference ignition timing displacement magnitude determining portion shown in FIG. 7.

FIG. 8 shows various waveforms in the operation of the reference ignition timing displacement determining portion 53 shown in FIG. 7. FIG. 8(d) shows the output voltage of the integrator 50a which is converted into a digital value by the A/D converter 50b. The retard/advance mode decision unit 53a has two reference values to be compared with its input value, one of which is a retard mode decision reference (V1) and the other of which is an advance mode decision reference (V2), whereby the output value of the A/D converter 50b is compared with the retard mode decision reference and the advance mode decision reference.

Figure 9:
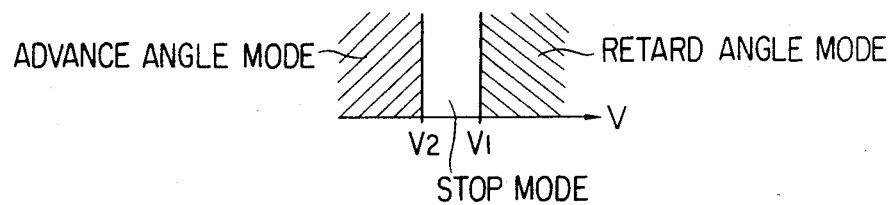
FIG. 9 shows a diagram for explaining the output modes of the retard/advance mode decision unit shown in FIG. 7.

FIG. 9 shows the output modes of the decision unit 53a. Now, when the output value V of the A/D converter 50b is above the retard mode decision reference V1, the decision unit 53a assumes the retard angle mode, thereby rendering the retard mode output thereof at a high logic level as shown in FIG. 8(k) while when the output value of the A/D converter 50b is below the advance mode decision reference V2, the decision unit 53a assumes the advance angle mode, thereby rendering the advance mode output thereof at the high level as shown in FIG. 8(l). When the output value of the A/D converter 50b is intermediate between the references V1 and V2, the decision unit 53a assumes a stop mode where the retard mode output and the advance mode output are at a low logic level.

While the retard mode output of the decision unit 53a is at the high level, the timer 53b provides as an output therefrom one pulse per a predetermined time interval as shown in FIG. 8(m). While the advance mode output of the decision unit 53a is at the high level, the timer 53c provides as an output therefrom one pulse per a predetermined time interval as shown in FIG. 8(n).

FIG. 8(p) shows the count of the up/down counter 53d which up-counts the output pulses of the timer 53b and down-counts the output pulses of the timer 53c. Therefore, when the output value of the A/D converter 50b is greater than the retard mode decision reference V1, the retard angle mode appears, thereby up-counting the count of the up/down counter 53d, when the output value of the A/D converter 50b is smaller than the advance angle reference V2, the advance angle mode appears, thereby down-counting the count of the up/down counter 53d, and when the output value of the A/D converter 50b is intermediate between the references V1 and V2, the stop mode appears, thereby retaining the current count of the up/down counter 53d.

As to the operation of the first ignition timing computing unit 55, the adder 55a adds the output value of the A/D converter 50b with the output value of the up/down counter 53d. It is repeated that the output value of the A/D converter 50b or the retard angle control magnitude determining portion 50 indicates a retard control angle for suppressing knocks on a real time basis while the output value of the up/down counter 53d or the reference ignition timing displacement magnitude determining portion 53 indicates a regulating value for the reference ignition timing according to the octane rating of the fuel in use. Therefore, the adder 55a provides as an output therefrom the sum of the retard control angle and the regulating value for the reference ignition timing. Then, the proportion factor calculator 55b converts the output value of the adder 55a into a corresponding proportion factor according to which the interpolator 55c interpolates the ignition timing data of the ROMs' 11 and 12 as in the first embodiment of this invention.

Thus, in this embodiment, the reference ignition timing displacement magnitude determining portion 53 decides whether the retard mode or the advance mode should be selected, on the basis of the output value of the determining portion 50, and determines a regulating value for the reference ignition timing, whereby an ignition timing calculation is made on the basis of the output values of the determining portion 50 and 53.

It is to be noted that the reference ignition timing displacement magnitude determining portion can be exchanged by the first ignition timing computing unit between the above first and second embodiments.

As described above, according to the first and second embodiments of this invention, in the case where a mixture of high-octane premium gasoline and low-octane regular gasoline is used for the engine, a knock sensor detects knock signals on the basis of which a displacement magnitude for the reference ignition timing is calculated to automatically regulate the reference ignition timing at an optimum ignition timing, and further during a transient operation of the engine or at a time of rapid transition of the environmental conditions, the ignition timing is controlled in the direction of retard angle on a real time basis, thereby immediately suppressing the occurrence of knocks.

Figure 10:
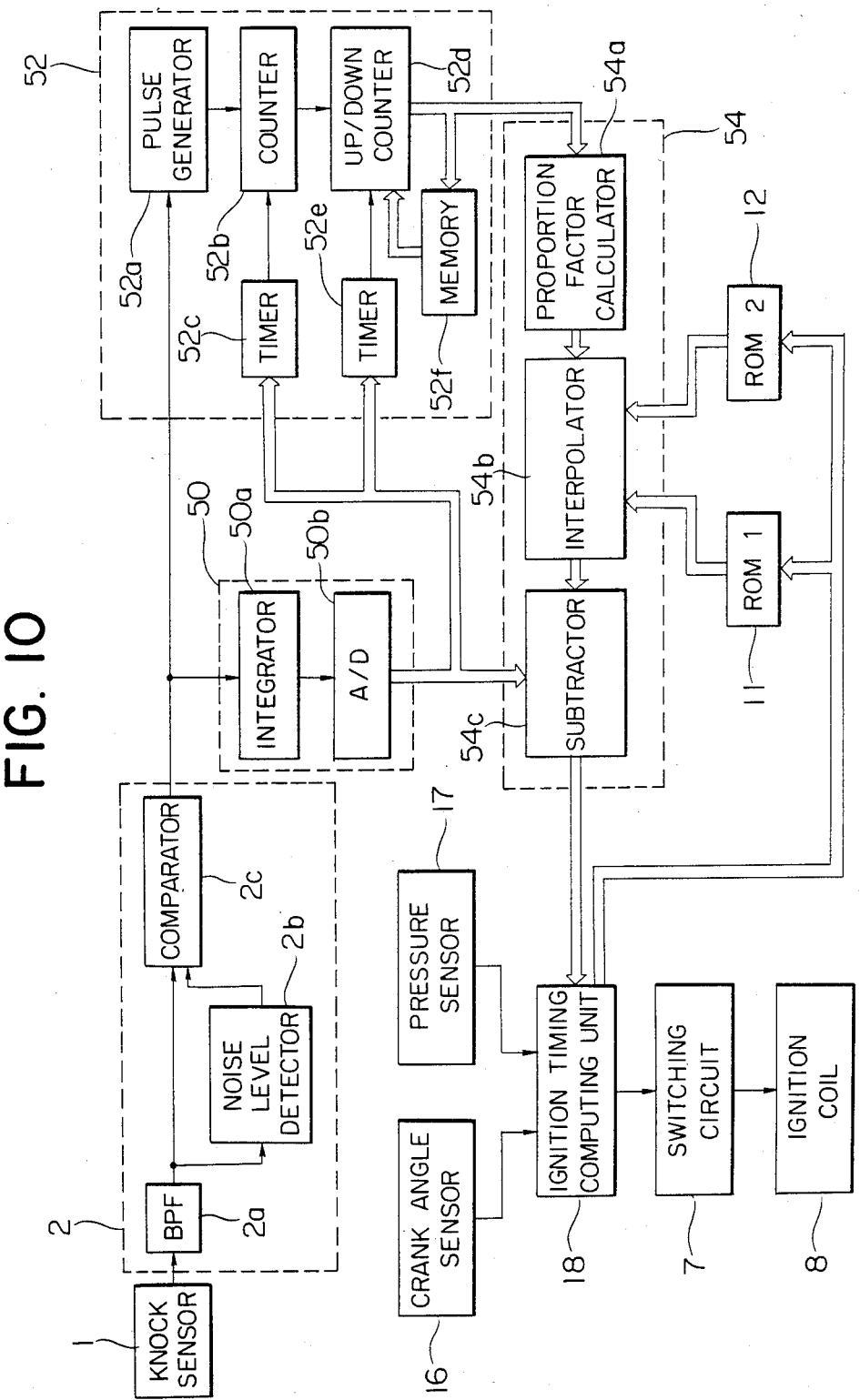
FIG. 10 shows a block diagram of an arrangement of a third embodiment of an ignition timing control apparatus for an internal combustion engine in accordance with this invention.

FIG. 10 shows a third embodiment of this invention which modifies the above first embodiment shown in FIG. 3.

Figure 1:
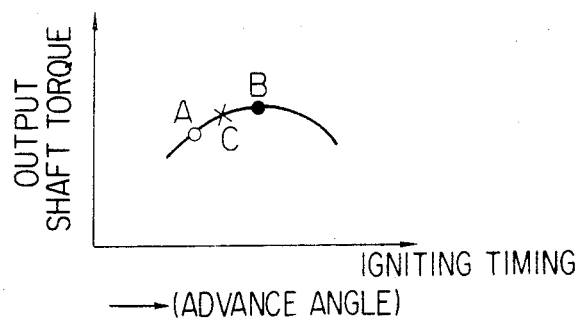
FIG. 1 shows an output shaft torque characteristic of an internal combustion engine as a function of ignition timing.

Namely, in the above first embodiment wherein it may take a considerable time to determine a reference ignition timing displacement magnitude on the basis of the detected magnitude of knocks and to complete the regulation of the reference ignition timing, when the fuel in use is changed over from regular gasoline to premium gasoline, the ignition timing does not reach point B shown in FIG. 1 until the completion of the above regulation so that the output of an engine can not be increased immediately after the change-over of the gasolines. Conversely, when a fuel in use is changed over from premium gasoline to regular gasoline, if the distance of the ignition timings of the knock limit points A and B shown in FIG. 1 is large, the range of a retard control angle for suppressing the occurrence of knocks is required to be set larger than the distance of the ignition timings A and B, resulting in a troublesome control.

This third embodiment is to improve the above disadvantage.

The arrangement of this embodiment is the same as that of the first embodiment shown in FIG. 3 except for the interconnection of the retard angle control magnitude determining portion 50 and the reference ignition timing displacement magnitude determining portion 52 in this third embodiment so that the description of the corresponding portions and elements denoted by the same reference numerals will not be repeated.

Is this third embodiment, as seen from FIG. 10, the output of the A/D converter 50b of the retard angle control magnitude determining portion 50 is connected to the inputs of the timers 52c and 52e of the reference ignition timing displacement magnitude determining portion 52.

Figure 11:
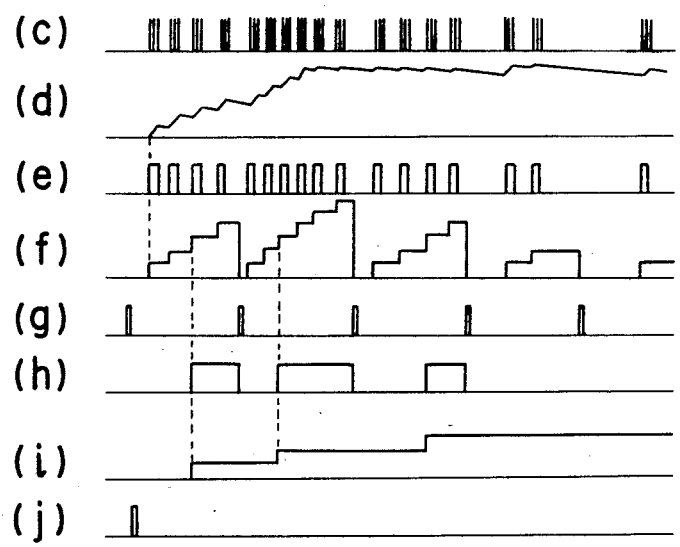
FIGS. 11c-j show disadvantageous waveform diagrams taken out of the various places of the retard angle control magnitude determining portion and the reference ignition timing displacement magnitude determining portion shown in FIG. 3 which does not include an improvement in responsiveness.

If the time intervals of pulses generated by the timer 52c and 52e are fixed at respective intervals, when a fuel in use is changed over from premium gasoline to regular gasoline, the working waveforms shown in FIG. 6 at the portions of the retard angle control magnitude determining portion 50 and the reference ignition timing displacement magnitude determining portion 52 assume working waveforms shown in FIG. 11 in which the same reference numerals designate working waveforms at the same places as in FIG. 3.

Particularly in FIG. 11(c), knock signals frequently occur so that the output voltage of the A/D converter 50b, that is the retard control angle, has a portion saturated at the maximum value as shown in FIG. 11(d).

On the other hand, the responsive rate of the displacement magnitude of the reference ignition timing is slow as indicated by the output count of the up/down counter 50b as shown in FIG. 11(i). Therefore, if the engine is operated with this state in the arrangement of FIG. 3, further intensive knocks continue to occur, creating a dangerous situation, whereby the engine may be damaged or destructed.

Conversely, when a fuel in use is changed over from regular gasoline to premium gasoline, the reference ignition timing displaced in the direction of the retard angle is not immediately displaced in the direction of the advance angle so that the ignition timing is situated in the direction of the retard angle for a while, although not shown in the figures. Therefore, the output of the engine can not be immediately increased by the change-over of the fuel to the premium gasoline.

In view of the above, it has been found that the above problem can be solved by the connection of the output of the retard angle control magnitude determining portion 50 (the output of the A/D converter 50b) to each of the timer control inputs of the timers 52c and 52e to vary the responsiveness of the reference ignition timing displacement magnitude determining portion 54 according to the retard control angle.

For this purpose, the timer 52c is adapted to operate such that the time interval of the output pulses decreases as the value of the timer control input increases while the timer 52e is adapted to operate such that the time interval of the output pulses decreases as the value of the timer control input decreases. In other words, as the retard control angle increases, the responsiveness of the reference ignition timing displacement magnitude determining portion 52 becomes fast in the direction of the retard angle while as the retard control angle decreases, the responsiveness thereof becomes fast in the direction of the advance angle.

Figure 12:
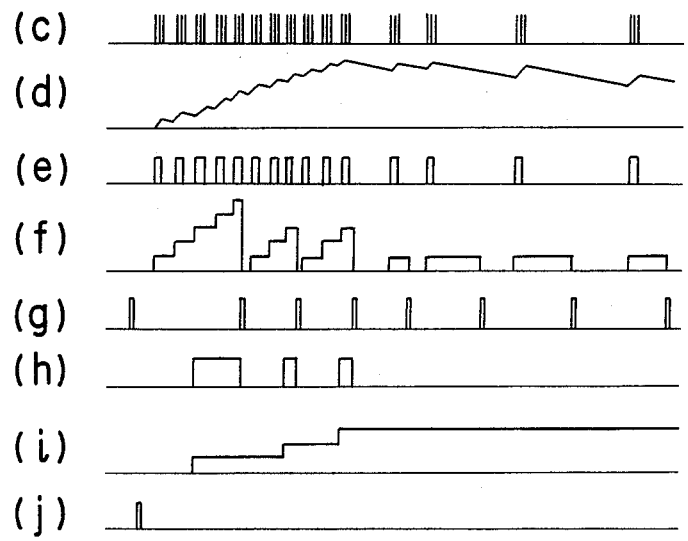
FIGS. 12c-j show advantageous waveform diagrams taken out of the various places of the retard angle control magnitude determining portion and the reference ignition timing displacement magnitude determining portion shown in FIG. 10 which includes an improvement in responsiveness.

Such imorovement in the responsiveness in the direction of the retard angle is illustrated in FIG. 12 wherein the same reference numerals designate working waveforms at the same places as in FIG. 11.

It can be seem from FIG. 12 that the time interval between of the output pulses of the timer 52c (FIG. 12(g)) decreases as the output voltage of the A/D converter 50b (FIG. 12(d)) increases whereby the responsiveness of the up-counting operation of the up/down counter 52d becomes fast. Additionally, since the responsiveness of the reference ignition timing displacement magnitude determining portion 52 represented by the count output of the up/down counter 52d becomes fast, the retard control angle which is the output voltage of the A/D converter 50b shown in FIG. 12(d) is not saturated.

Figure 13:
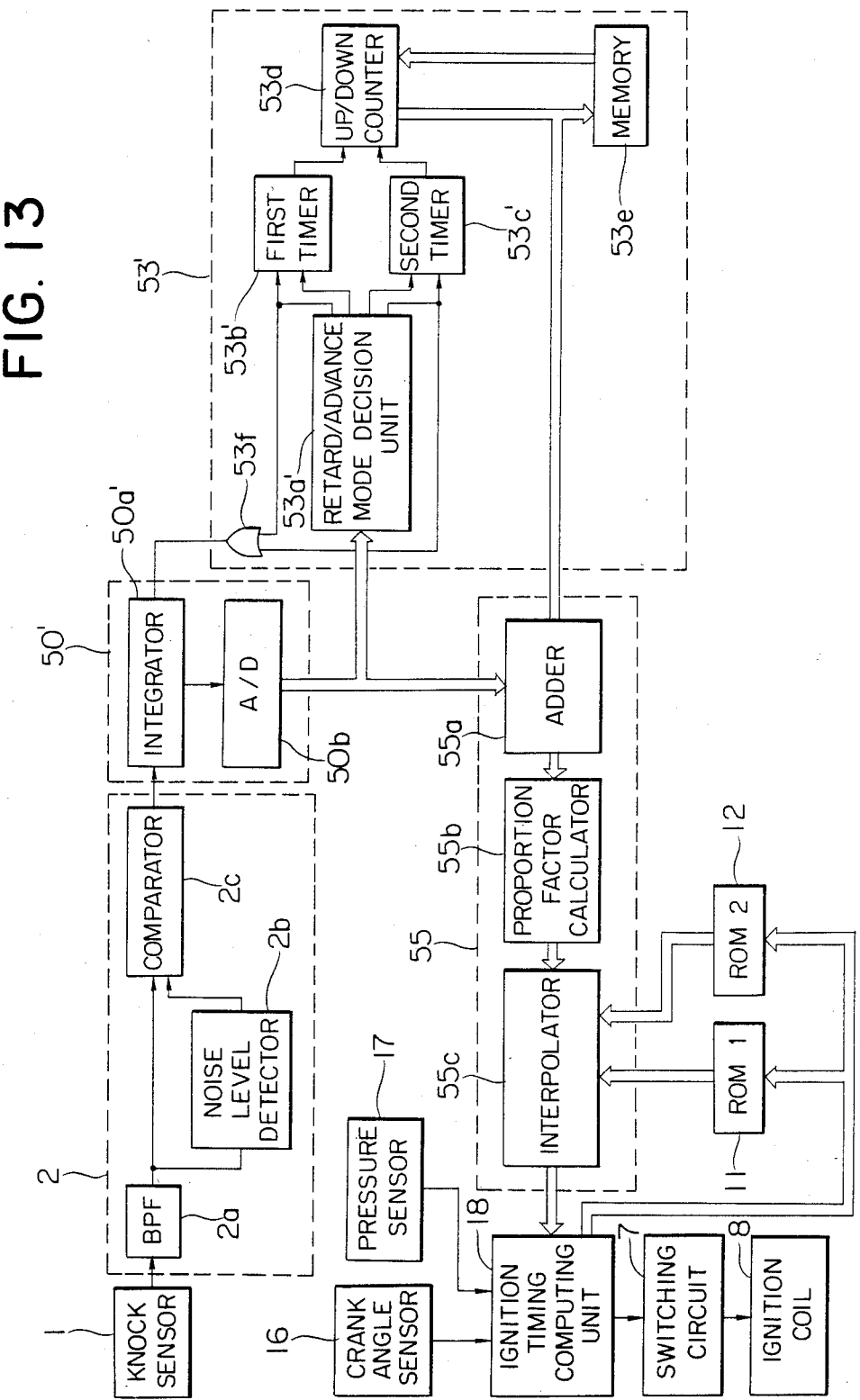
FIG. 13 shows a block diagram of an arrangement of a fourth embodiment of an ignition timing control apparatus for an internal combustion engine in accordance with this invention.

FIG. 13 shows a fourth embodiment of this invention which modifies the second embodiment of this invention shown in FIG. 7 to eliminate such a disadvantage in responsiveness as also included in the above second embodiment.

The arrangement of this embodiment is the same as that of the second embodiment shown in FIG. 7 except for the provision of an integrator 50a' in a retard angle control magnitude determining portion 50', and a retard/advance mode decision unit 53a', timers 53b' and 53c', and an OR gate 53f in a reference ignition timing displacement magnitude determining portion 53' in this fourth embodiment so that the description of the corresponding portions and elements denoted by the same reference numerals will not be repeated.

In this embodiment, the integrator 50a' has a reset input terminal to fix the integrated voltage at a predetermined level. The integrated voltage output of the A/D converter 50b is received as an input by the retard/advance mode decision unit 53a' having four outputs, that is an advance mode output, a rapid advance mode output, a retard mode output, and a rapid retard mode output. The timer 53b' has a retard mode input terminal and a timer control input terminal which are connected to the retard mode output terminal and the rapid retard mode output terminal respectively of the unit 53a', and has an output terminal connected to the up-counting input terminal of the up/down counter 53d. The timer 53c' has an advance mode input terminal and a timer control input terminal which are connected to the advance mode output terminal and the rapid advance mode output terminal respectively of the unit 53a', and has an output connected to the down-counting input terminal of the up/down counter 53d.

The rapid retard angle output and the rapid advance angle output of the retard/advance mode decision unit 53a' are commonly connected to the reset input terminal of the integrator 50a' through the OR gate 53f.

Figure 14:
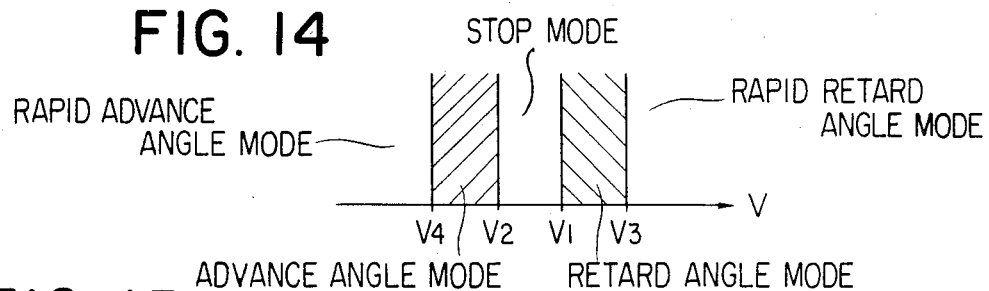
FIG. 14 shows an output mode of the retard/advance mode decision unit used in FIG. 13.

The retard/advance mode decision unit 53a' has therein four reference values to be compared with the output value of the A/D converter 50b. The reference values are a retard mode decision reference V1, an advance mode decision reference V2, a rapid retard mode decision reference V3, and a rapid advance mode decision reference V4 which are graphically illustrated in FIG. 14.

It is to be noted that the functions of the decision unit 53a', the timers 53b' and 53c', and the up/down counter 53d in terms of the retard mode decision reference V1 and the advance mode decision reference V2 have been described referring to the second embodiment shown in FIG. 7.

Figure 15:
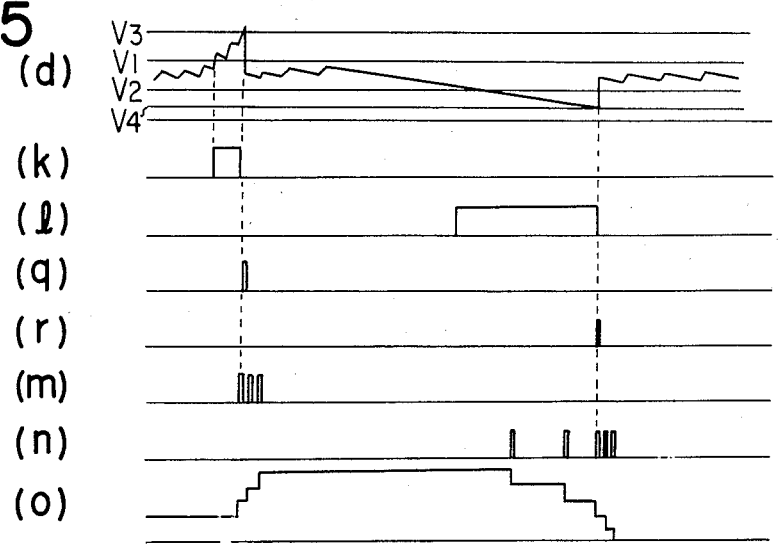
FIGS. 15d, 15k-o, and 15q-r show advantageous waveform diagrams taken out of the various places of the retard angle control magnitude determining portion and the reference ignition timing displacement magnitude determining portion shown in FIG. 13 which includes an improvement in responsiveness.

FIG. 15 shows waveforms at various places, similar to the second embodiment in FIG. 7, of the retard angle control magnitude determining portion 50' and the reference ignition timing displacement magnitude determining portion 53', in the event that the output value V of the A/D converter 50b is above the rapid retard mode decision reference V3 and below the rapid advance mode decision reference V4.

Now, when the output value V of the A/D converter 50b is above the rapid retard mode decision reference V3, the decision unit 53a' assumes the rapid retard angle mode, thereby rendering the rapid retard mode output thereof at a high logic level as shown in FIG. 15(q) while when the output value V of the A/D converter 50b is below the rapid advance mode decision reference V4, the decision unit 53a' assumes the rapid advance angle mode, thereby rendering the rapid advance mode output thereof at the high level as shown in FIG. 15(r).

The timer 53b' generates a predetermined number of pulses of an extremely short time interval at the time when the rapid retard decision output rises from the low level to the high level as shown in FIG. 15(m) while at the same time the output voltage of the integrator 50a' is reset so that the output of the A/D converter 50b may assume a predetermined value between V1 and V2 when the rapid retard decision output is at the high level. The timer 53c' generates a predetermined number of pulses of an extremely short time interval at the time when the rapid advance angle decision output rises from the low level to the high level as shown in FIG. 15(n) while at the same time the output voltage of the integrator 50a' is reset so that the output of the A/D converter 50b may assume a predetermined value between V1 and V2 when the rapid advance angle decision output is at the high level.

FIG. 15(o) shows the output count of the up/down counter 53d which rapidly up-counts by the reception of the output pulses of the timer 53b' (FIG. 15(m)) and which rapidly down-counts by the reception of the output pulses of the timer 53c' (FIG. 15(n)).

Thus, when the output value of the retard angle control magnitude determining portion 50' exceeds the rapid retard mode decision reference V3, the engine operates under a rapid retard mode to make the output value of the reference ignition timing displacement magnitude determining portion 53' rapidly increase. On the other hand, when the output of the determining portion 50' becomes less than the rapid advance mode decision reference V4, the engine operates under a rapid advance angle mode to make the output of the determining portion 53' rapidly decrease.

In this manner, the responsiveness of the reference ignition timing displacement magnitude determining portion 53' can be made temporarily faster. In this connection, since excessive displacement for the reference ignition magnitude due to the rapid responsiveness of the determining portion 53' occurs if the output value of the determining portion 50' remains unchanged, the output value of the retard angle control magnitude determining portion 50' is reset to a proper value together with the rapid response of the reference ignition timing displacement magnitude determining portion.

As in the above third and fourth embodiments, in the case where the fuel used is changed over, the responsiveness in the displacement of the reference ignition timing is made faster, providing a rapid effect for ignition timing in such a change-over of the fuel.

Figure 16:
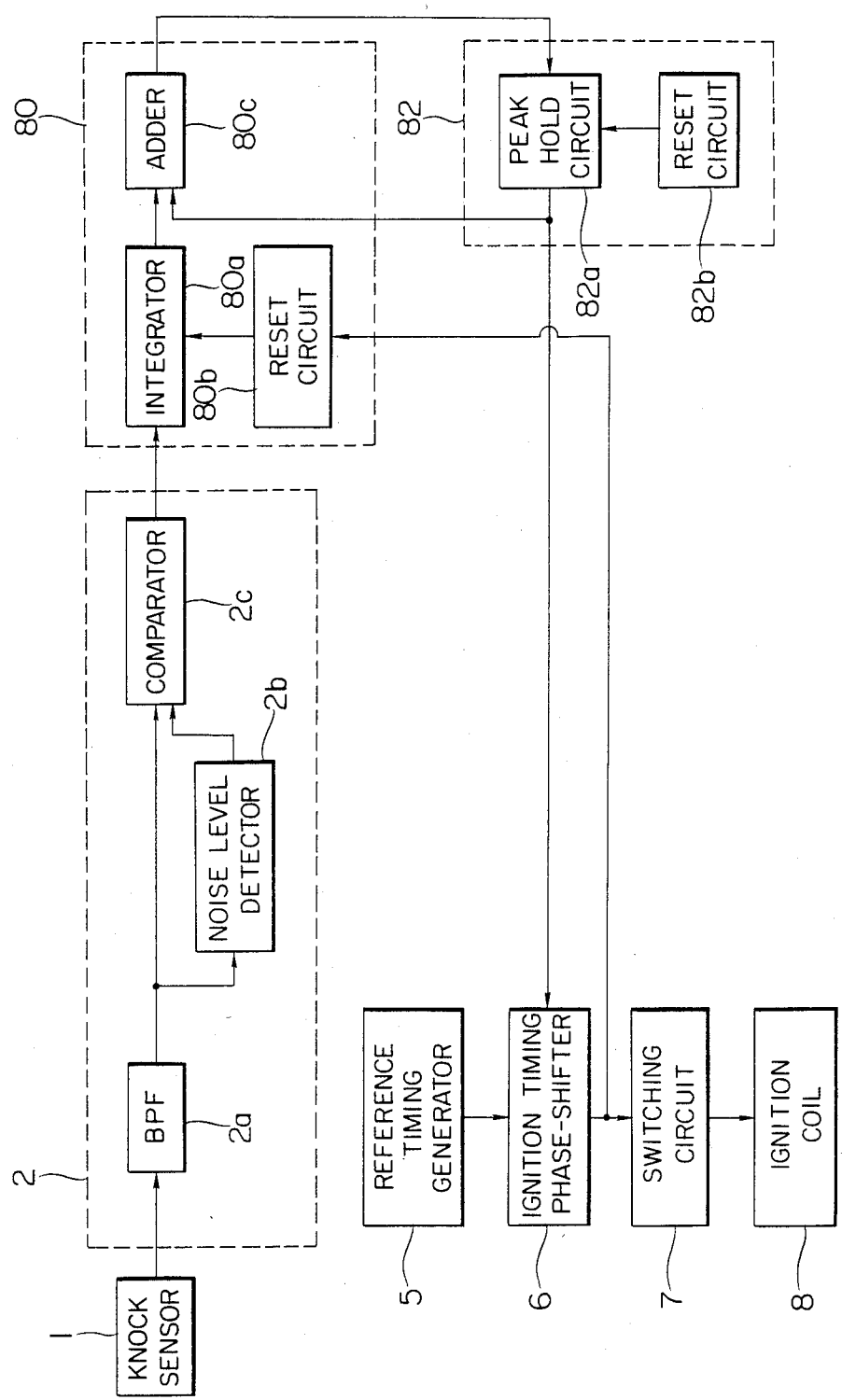
FIG. 16 shows a block diagram of an arrangement of a fifth embodiment of an ignition timing control apparatus for an internal combustion engine in accordance with this invention.

FIG. 16 shows a fifth embodiment of this invention wherein a continuous ignition timing control except for a retard angle controlling correction on a real time basis as in the above is also performed in another manner.

In this figure, a generator 5 generates a reference ignition timing signal of the engine, and an ignition timing phase-shifter 6 as is well known in the art phase-shifts the output signal of the reference ignition timing signal generator 5. A switching circuit 7 energizes or deenergizes an ignition coil 8 in synchronization with the output signal of the phase-shifter 6 to produce a high voltage necessary for the ignition of the engine.

This embodiment is characterized by the provision of a reference ignition timing displacement magnitude determining portion 80 and a storage portion 82. The other elements designated by the same reference numerals as in the previous embodiments correspond to identical portions and elements so that the description of those portions and elements will not be repeated.

The reference ignition timing displacement magnitude determining portion 80 is formed of an integrator 80a, a reset circuit 80b, and an adder 80c. The input of the integrator 80a is connected to the output of the comparator 2c, and the output thereof is connected to one input of the adder 80c. The integrator 80a has a reset terminal for resetting the integrated value to zero, the reset terminal being connected to the output of the reset circuit 80b.

The storage portion 82 serves to store the output value of the reference ignition timing displacement magnitude determining portion and is formed of a peak hold circuit 82a and a reset circuit 82b. The input of the peak hold circuit 82a is connected to the output of the adder 80c, and a reset terminal associated with the peak hold circuit 82a is connected to the reset circuit 82b. The output of the peak hold circuit 80a is connected to the other input of the adder 80c so that the output of the integrator 80a and the output of the peak hold circuit 82a are summed by the adder 80c. The output of the peak hold circuit 82a is also connected to the control input of the ignition timing phase-shifter 6 as previously described.

Figure 17:
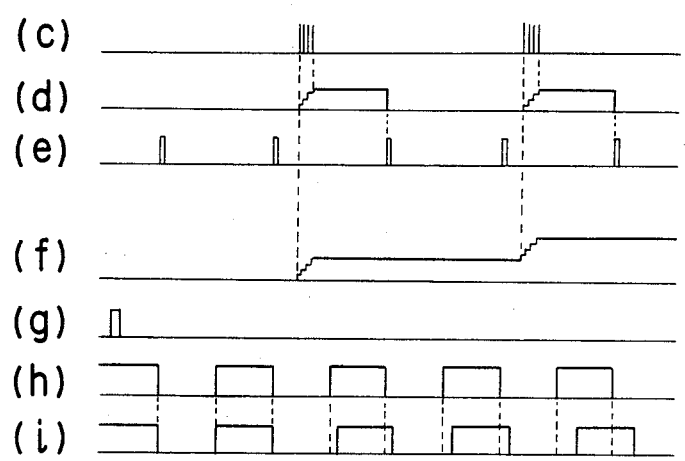
FIGS. 17c-i show waveform diagrams observed at various places of the reference ignition timing displacement magnitude determining portion and the storage portion shown in FIG. 16.

FIG. 17 shows waveforms observed at various places of the reference ignition timing displacement magnitude determining portion 80, the storage portion 82, and the ignition timing phase-shifter 6.

The integrator 80a integrates the output knocking pulse train of the comparator 2c as shown in FIG. 17(c). The reset circuit 80b receives as an input an output signal (ignition signal) of the ignition timing phase-shifter 6, and then provides as an output therefrom pulses as shown in FIG. 17(e) to reset the integrated value of the integrator 80a to zero. Accordingly, the output of the integrator 80a rises upon the occurrence of knocks as shown in FIG. 17(d) while it is reset per each ignition time.

The adder 80c adds the output value (FIG. 17(d)) of the integrator 80a with the output value of the peak hold circuit 82a. At this time, the output value of the peak hold circuit 82a to be added is the last value before the addition which is retained in the adder 80c while the output value of the integrator 80b is not increased. The peak hold circuit 82a holds the peak value of the output of the adder 80c as shown in FIG. 17(f). The reset circuit 82b provides as an output therefrom pulses at the high logic level at the starting time of engine, as shown in FIG. 17(g).

Initially, the peak hold circuit 82a is reset by the reset circuit 82b at the starting time of engine whereby the output of the circuit 82a becomes zero. Then, when knocks arise in the engine and a pulse train shown in FIG. 17 appears at the output of the comparator 2c, the integrator 80a integrates the pulse train as shown in FIG. 17(d). The adder 80c adds the integrated value of the integrator 80a and the output value of the peak hold circuit 82a which retains the output peak value of the adder 80c as shown in FIG. 17(f). This operation will continue until no knocks occur in the engine and therefore cause the output value of the peak hold circuit 82a to be increased.

The output of the peak hold circuit 82a is inputed into the control voltage input of the phase-shifter 6 whereby the output signal of the reference ignition timing signal generator 5 shown in FIG. 17(h) is phase-shifted by the phase-shifter 6 in the direction of retard angle according to the output value of the peak hold circuit 82a, as shown in FIG. 17(i).

Figure 4:
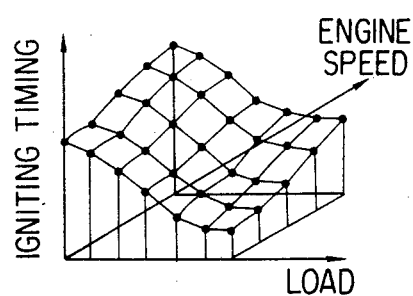
FIGS. 4A and 4B show maps of ignition timing characteristics stored in a memory, depending on the octane rating of a fuel.
Figure 4:
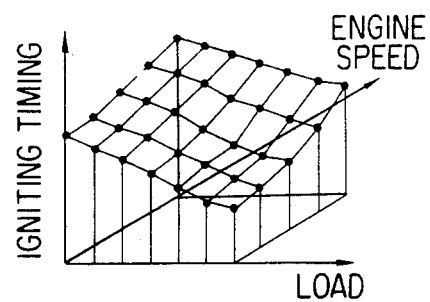

Now, when the output of the peak hold circuit 82a is at the zero level, the phase-shifter 6 carries out no phase-shift operation so that the phase-shifter 6 causes the output signal of the signal generator 5 to be directly provided as an output without any change, with the result that the ignition timing characteristic which has been initially set to have the characteristic shown in FIG. 4 remain unchanged.

On the other hand, when knock arises so that the displacement magnitude determining portion 80 calculates the retard phase-shift angle, thereby increasing the output value of the peak hold circuit 82a, the phase-shifter 6 phase-shifts the output signal of the reference ignition timing signal generator 5 according to the output value of the peak hold circuit 82a as shown in FIG. 17(i). Therefore, the actual ignition timing is as shown in FIG. 2 by dotted curve C.

Accordingly, in the case where premium gasoline is used, since no knock occurs in the ignition timing characteristic shown in FIG. 2 by the curve B, the reference ignition timing is not retarded but remains the same while in the case where regular gasoline or a mixture of regular gasoline and premium gasoline is used, since the ignition timing characteristic shown in FIG. 2 by the curve B resides in a region where knocks may occur, the engine generates knocks. Then, as described above, the knocks are detected through the knocking signal deriving portion 2, the reference ignition timing displacement magnitude determining portion 80, the storage portion 82, and the ignition timing phase-shifter 6, thereby phase-shifting the ignition timing in the direction of the retard angle. As a result, even in the case where regular gasoline or mixture of the regular and premium gasolines, the ignition timing is fixed at an ignition timing characteristic, causing no occurrence of knocks, as shown in FIG. 2 by the curve A for the use of the regular gasoline or as shown in FIG. 2 by the curve C for the use of the mixture of both gasolines.

It is to be noted that while in the above embodiment the displacement magnitude determining portion 80 and the storage portion 82 have been described as an analog circuit, the integrator 80a may be replaced by a counter, the adder 80c by a digital adder, and the peak hold circuit 82a by a digital memory if the ignition timing phase-shifter 6 is to be formed of a digital circuit.

Figure 18:
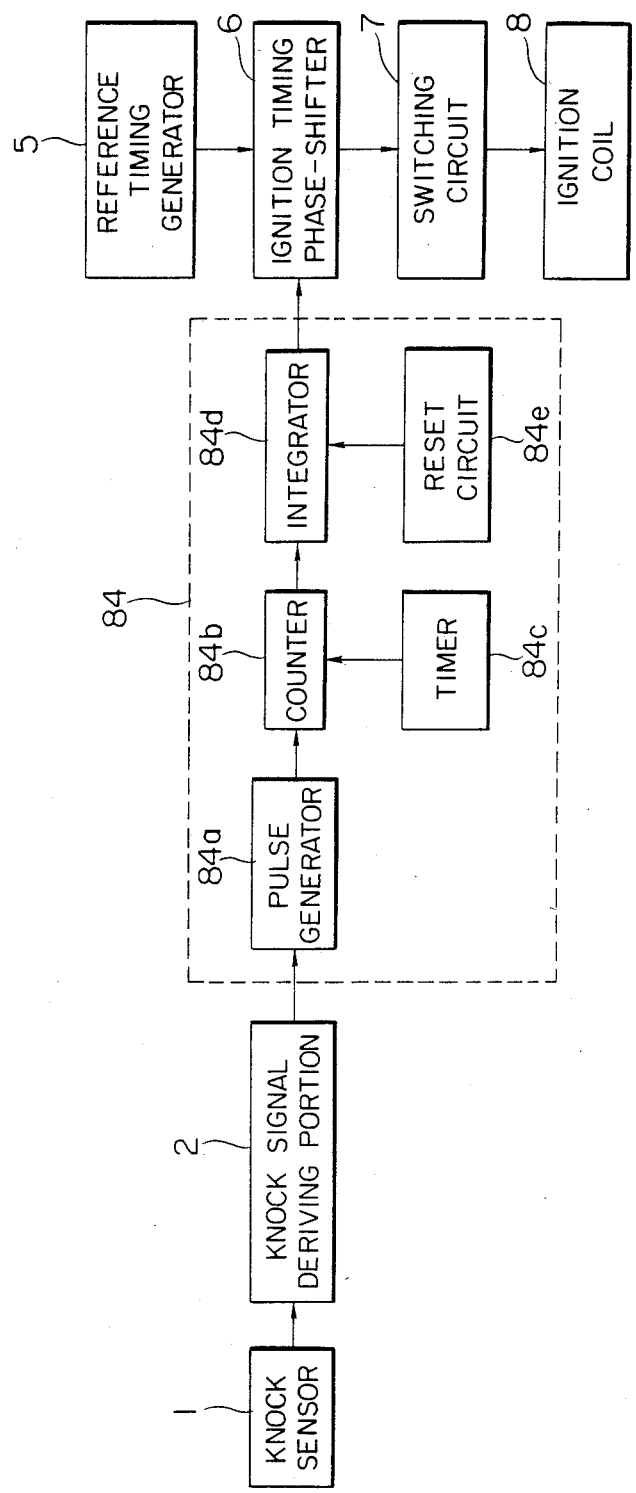
FIG. 18 shows a block diagram of an arrangement of a sixth embodiment of an ignition timing control apparatus for an internal combustion engine in accordance with this invention.

FIG. 18 shows an sixth embodiment of this invention which only differs from the fifth embodiment in that a reference ignition timing displacement magnitude determining portion 84 of this sixth embodiment includes the functions of the reference ignition timing displacement magnitude determining portion 80 and the storage portion 82 of the fifth embodiment.

In FIG. 18, the ignition timing displacement magnitude determining portion 84 is formed of a pulse generator 84a, a counter 84b, a timer 84c, an integrator 84d, and a reset circuit 84e. The input of the pulse generator 84a is connected to the output of the comparator 2c, and the output thereof is connected to the counting input of the counter 84b. The timer 84c is connected to the reset input of the counter 84b. The integrator 84d integrates the output of the counter 84b and the integrated output is connected to the ignition timing phase-shifter 6. The other portions and elements have been described in the previous embodiments.

Figure 19:
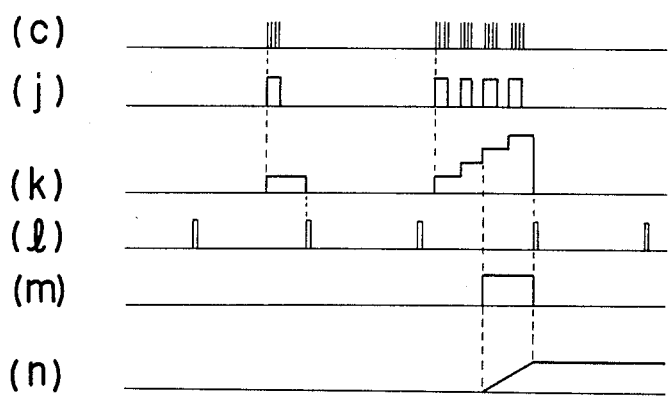
FIGS. 19c and 19j-n show waveform diagrams observed at various places of the reference ignition timing displacement magnitude determining portion shown in FIG. 18; and, FIG. 20 shows a block diagram of an arrangement of a seventh embodiment of an ignition timing control apparatus for an internal combustion engine in accordance with this invention.

FIG. 19 shows waveforms observed at various places of the ignition timing displacement magnitude determining portion 84.

The pulse generator 80a provides as an output therefrom pulses as shown in FIG. 19(j) upon reception of the knock output (FIG. 19(c)) of the comparator 2c of the portion 2. Namely, the pulse generator 80a generates one pulse per the occurrence of knocks for a single ignition. The output pulses of the pulse generator 80a are counted by the counter 80b whose count is shown in FIG. 19(k). The timer 84c provides as an output therefrom a pulse per a predetermined time interval as shown in FIG. 19(l) to reset the count of the counter 84b to zero. The output of the counter 84b assumes the high level when the count of the counter 84b reaches a predetermined value (three count in FIG. 19(k)), as shown in FIG. 19(m). Namely, when a predetermined number of knock signals are detected within a predetermined time interval, the counter 84b provides as an output therefrom a signal at the high level. In other words, the calculation of the occurrence rate of knocks has been carried out. Then the integrator 84b integrates the output of the counter 84b (FIG. 19(m)) and stores or retains the integrated value as shown in FIG. 19(n). The reset circuit 84e provides as an output therefrom a pulse at the starting time of engine, thereby resetting the integrated value of the integrator 84a to zero. The ignition timing phase-shifter 6 phase-shifts the reference ignition timing signal in the direction of the retard angle according to the output level of the integrator 84d.

Thus, according to this sixth embodiment, by the calculation of the occurrence rate of knocks in the engine and the integration of the result, the ignition timing characteristic can be fixed as shown in FIG. 2 by the curve C when the regular gasoline or the mixture of the regular and the premium gasolines is used.

While in the above embodiment, the occurrence rate of knocks is calculated to phase-shift the ignition timing in the direction of the retard angle, the output pulses of the comparator 2c may be directly inputed into the integrator 84d as a brief method.

Furthermore, while in the above fifth and sixth embodiments, the reset circuit has been used to define the starting time of the engine, the removal of the fuel cap or the variation of the remaining volume of the fuel may be detected to acknowledge whether or not gasoline has been newly added, thereby generating a reset pulse.

It has been described in the above fifth and sixth embodiments that the reference ignition timing signal is phase-shifted in the direction of retard angle according to the output of the storage portion. On the other hand, it is also possible that the ignition timing is displaced according to the output of the storage portion between two reference ignition timing signals having different ignition timing characteristics.

Figure 20:
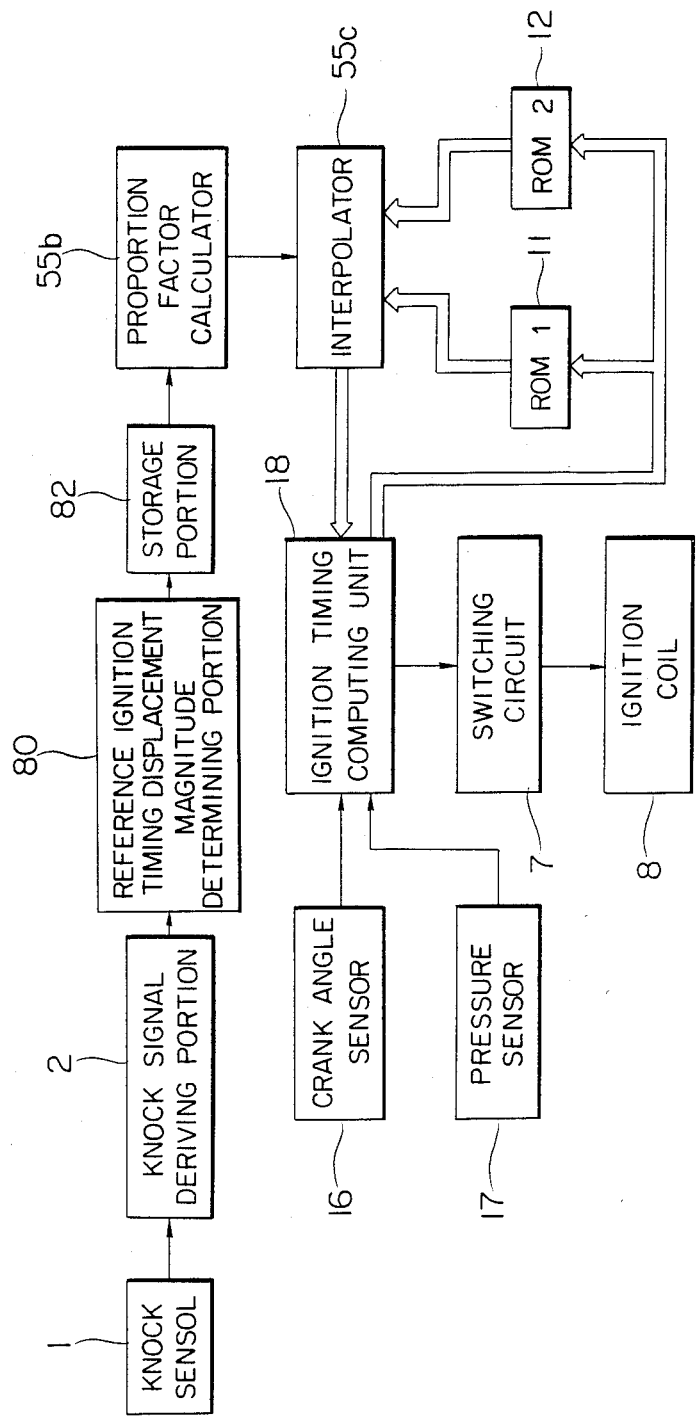

This possibility has been realized by a seventh embodiment of this invention shown in FIG. 20.

From FIG. 20, it can be seen that the arrangement of this embodiment is a combination of the knock sensor 1, the knock signal deriving portion 2, the reference ignition timing displacement magnitude determining portion 80, and the storage portion 82 in the fifth embodiment with, for example, the proportion factor calculator 55b, the interpolator 55c, the ROMs' 11 and 12, the ignition timing computing unit 18, the crank angle sensor 16, the pressure sensor 17, the switching circuit 7, and the ignition coil 8 in the second embodiment shown in FIG. 7.

Namely, after the occurrence rate of knocks has been calculated by the combination of the knock sensor 1, the knock signal deriving portion 2, and the reference ignition timing displacement magnitude 80 to provide a regulation or displacement magnitude for the reference ignition timing according to the octane rating of a fuel in use, and the calculated value has been then stored by the storage portion 82, the proportion factor calculator 55b converts the stored value of the storage portion 82 into a corresponding proportion factor, the interpolator 55c performs an interpolating operation by using the ignition timing data stored in the ROMs' 11 and 12, and the ignition timing computing unit 18 reads out the ignition timing data outputed from the interpolator 55c to compute an ignition timing for an ignition signal of the switching circuit 7 on the basis of the output signal of the sensor 16 as described many times above.

As described in the above fifth to seventh embodiments, in the case where the mixture of regular gasoline and premium gasoline is used, the occurrence of knocks is detected, on the basis of which a displacement magnitude for the reference ignition timing is calculated, whereby the reference ignition timing characteristic can be automatically controlled at an optimum ignition timing characteristic which causes no occurrence of knocks in the mixture of regular gasoline and premium gasoline.

It will be appreciated from all of the above embodiments of this invention that the subject matter of this invention consists of the combination of a modification of advance angle and a real time correction of advance angle. Particularly, this invention can carry out a continuous control for ignition timing. In this control, regardless of whether a regular low-octane gasoline or a premium high-octane gasoline is used for an engine, this invention can perform an optimum ignition timing control to provide a desirable output by the engine.

It should be also noted that this invention is not limited to the embodiments described above but various modification can be made without departing from the spirit of this invention.

We claim:

1. An ignition timing control apparatus for an internal combustion engine having a reference ignition timing comprising:
   sensing means for sensing vibrations including knocks of said engine;
   knock signal deriving means for deriving knock signals from the output of said sensing means;
   correction magnitude determining means for determining from said knock signals derived by said knock signal deriving means an ignition timing correction magnitude for suppressing the occurrence of knock;
   displacement magnitude determining means for determining from at least one of an output of said knock signal deriving means and an output of said correction magnitude determining means a displacement magnitude for said reference ignition timing corresponding to the octane rating of a fuel used in said engine; and
   ignition timing determining means for setting the reference ignition timing at an optimum ignition timing angle for said engine responsive to the correction magnitude determined by said correction magnitude determining means and the displacement magnitude determined by said displacement magnitude determining means.

2. An ignition timing control apparatus for an internal combustion engine according to claim 1 wherein said ignition timing determining means includes an interpolating operation means for performing an interpolating operation between two reference ignition timing characteristics according to a proportional factor corresponding to the octane rating of said fuel.

3. An ignition timing control apparatus for an internal combustion engine according to claim 2 wherein said knock sensing means comprises a vibration acceleration sensing means.

4. An ignition timing control apparatus for an internal combustion engine according to claim 3 wherein said knock signal deriving means comprises a bandpass filter connected to said sensing means for passing therethrough an output having only a frequency component inherent in the knocks comprising a noise component and a knock component, a noise level detector for converting said output of said bandpass filter into a DC voltage with a predetermined amplification, said DC voltage being higher than the noise component while lower than the knock component of the filtered output, and a comparator for comparing the outputs of said filter and said noise level detector to derive said knock signals.

5. An ignition timing control apparatus for an internal combustion engine according to claim 4 wherein said correction magnitude determining means comprises an integrator for integrating an output of said knock signal deriving means, and an A/D converter connected to said integrator.

6. An ignition timing control apparatus for an internal combustion engine according to claim 5 wherein said displacement magnitude determining means comprises a pulse generator connected to said comparator to generate one pulse per occurence of knock for one ignition, a counter connected to said pulse generator to count output pulses of said generator and to provide a logic signal indicating the presence of a predetermined knock occurrence rate per a first predetermined time interval set by a first timer, an up/down counter for counting up by one when said logic signal changes and for counting down by one for every second predetermined time interval set by a second timer, said second time interval being longer than said first predetermined time interval.

7. An ignition timing control apparatus for an internal combustion engine according to claim 5 wherein said displacement magnitude determining means includes an advance/retard decision unit connected to said A/D converter for comparing the output of said A/D converter with a predetermined value to provide as outputs therefrom an advance control signal and a retard control signal according to the compared result, first and second timers connected to said decision unit to receive said advance and retard control signals, respectively, and an up/down counter for counting up and down, respectively, from said first and second timers.

8. An ignition timing control apparatus for an internal combustion engine according to claim 2 wherein said ignition timing determining means comprises first and second storages for respectively storing first and second ignition timing characteristics for a high-octane and a low-octane rating fuels respectively, an engine speed detecting means, a load condition detecting means, and an ignition timing computing unit for converting ignition timing data, determined by an engine speed detected by said engine speed detecting means and by a load condition detected by said load condition detecting means, into corresponding address data and for sending the address data to said first and second storages.

9. An ignition timing control apparatus for an internal combustion engine according to claim 8 wherein said interpolating operation means includes means for providing a proportional factor corresponding to the octane rating of said fuel based on a knock occurrence rate indicated by said displacement magnitude determining means, an interpolator for performing an interpolating operation according to said proportional factor between the first and second ignition timing characteristics respectively stored in said first and second storages, and a subtractor for subtracting said output of said correction magnitude determining means from an output produced by said interpolator.

10. An ignition timing control apparatus for an internal combustion engine according to claim 8 wherein said interpolating operation means includes an adder for adding the output of said correction magnitude determining means and the output of said displacement magnitude determining means, means for providing a proportional factor corresponding to the octane rating of said fuel based on the output of said adder, an interpolator for performing an interpolating operation according to said proportional factor between the first and second ignition timing characteristics respectively stored in said first and second storages.

11. An ignition timing control apparatus for an internal combustion engine according to claim 1, further comprising means for varying the responsiveness of said displacement magnitude determining means in response to the output value of said correction magnitude determining means.

12. An ignition timing control apparatus for an internal combustion engine according to claim 11 wherein said ignition timing determining means includes an interpolating operation means for performing an interpolating operation between two reference ignition timing characteristics according to a proportional factor corresponding to the octane rating of said fuel.

13. An ignition timing control apparatus for an internal combustion engine according to claim 12 wherein said knock sensing means comprises a vibration acceleration sensing means.

14. An ignition timing control apparatus for an internal combustion engine according to claim 13 wherein said knock signal deriving means comprises a bandpass filter connected to said sensing means for passing therethrough an output having only a frequency component inherent in the knock comprising a noise component and a knock component, a noise level detector for converting said output of said bandpass filter into a DC voltage with a predetermined amplification, said DC voltage being higher than the noise component while lower than the knock component of the filtered output, and a comparator for comparing the outputs of said filter and said noise level detector to derive said knock signals.

15. An ignition timing control apparatus for an internal combustion engine according to claim 14 wherein said correction magnitude determining means comprises an integrator for integrating an output of said knock signal deriving means, and an analog-digital converter connected to said integrator.

16. An ignition timing control apparatus for an internal combustion engine according to claim 14 wherein said displacement magnitude determining means comprises a pulse generator connected to said comparator to generate one pulse per occurrence of knock for one ignition, a counter connected to said pulse generator to count output pulses of said generator and to provide a logic signal indicating the presence of a predetermined knock occurrence rate per a first predetermined time interval set by a first timer, an up/down counter for counting up by one when said logic signal changes and for counting down by one for every second predetermined time interval set by a second timer, said second timer interval being longer than said first predetermined time interval, said first and second timers being responsive to said A/D converter.

17. An ignition timing control apparatus for an internal combustion engine according to claim 12 wherein said ignition timing determining means comprises first and second storages for respectively storing first and second ignition timing characteristics for a high-octane and a low-octane rating fuels respectively, an engine speed detecting means, a load condition detecting means, and an ignition timing computing unit for converting ignition timing data, determined by engine speed detected by said engine speed detecting means and by a load condition detected by said load condition detecting means, into corresponding address data and for sending the address data to said first and second storages.

18. An ignition timing control apparatus for an internal combustion engine according to claim 12 wherein said interpolating operation means includes means for providing a proportional factor corresponding to the octane rating of said fuel based on a knock occurrence rate indicated by said displacement magnitude determining means, an interpolator for performing an interpolating operation according to said proportional factor between the first and the second ignition timing characteristics respectively stored in said first and second storages, and a subtractor for subtracting said output of said correction magnitude determining means from an output produced by said interpolator.

19. An ignition timing control apparatus for an internal combustion engine according to claim 11 wherein said displacement magnitude determining means includes means connected to receive the output of said correction magnitude determining means for rapidly varying the displacement magnitude determined by said displacement magnitude determining means in a direction depending on said correction magnitude relative to a predetermined value and for resetting said correction magnitude determining means in a corresponding direction.

20. An ignition timing control apparatus for an interanl combustion engine according to claim 19 wherein said ignition timing determining means includes an interpolating operation means for performing an interpolating operation between two reference ignition timing characteristics according to a proportional factor corresponding to the octane rating of said fuel.

21. An ignition timing control apparatus for an internal combustion engine according to claim 20 wherein said knock sensing means comprises a vibration acceleration sensing means.

22. An ignition timing control apparatus for an internal combustion engine according to claim 21 wherein said knock signal deriving means comprises a bandpass filter connected to said sensing means for passing therethrough an output having only a frequency component inherent in the knocks comprising a noise component and a knock component, a noise level detector for converting said output of said bandpass filter into a DC voltage with a predetermined amplification, said DC voltage being higher than the noise component while lower than the knock component of the filtered output, and a comparator for comparing the outputs of said filter and said noise level detector to derive said knock signals.

23. An ignition timing control apparatus for an internal combustion engine according to claim 22 wherein said correction magnitude determining means comprises an integrator for integrating an output of said knock signal deriving means, and an analog-digital converter connected to said integrator.

24. An ignition timing control apparatus for an internal combustin engine according to claim 19 wherein said displacement magnitude determining means includes an advance/retard decision unit connected to said A/D converter for comparing the output of said A/D converter with four predetermined values to provide as outputs therefrom an advance control signal, a rapid advance control signal, a retard control signal, and a rapid retard control signal according to the compared result, first and second timers connected to said decision unit to receive said advance, rapid advance, retard and rapid retard control signals, respectively, an up/down counter for counting up and down, respectively, from said first and second timers, and an OR gate with inputs for receiving said rapid advance and rapid retard control signals and with an output connected to cause said integrator to be reset.

25. An ignition timing control apparatus for an internal combustion engine according to claim 20 wherein said ignition timing determining means comprises first and second storages for respectively storing first and second ignition timing characteristics for a high-octane and a low-octane rating fuels respectively, an engine speed detecting means, a load condition detecting means, and an ignition timing computing unit for converting ignition timing data, determined by an engine speed detected by said engine speed detecting means and by a load condition detected by said load condition detecting means, into corresponding address data and for sending the address data to said first and second storages.

26. An ignition timing control apparatus for an internal combustion engine according to claim 20 wherein said interpolating operation means includes an adder for adding the output of said correction magnitude determining means and the output of said displacement magnitude determining means, means for providing a proportional factor corresponding to the octane rating of said fuel based on the output of said adder, an interpolator for performing an interpolating operation according to said proportional factor between the first and second ignition timing characteristics respectively stored in said first and second storages.

27. An ignition timing control apparatus for an internal combustion engine according to claim 1 wherein said displacement magnitude determining means includes means for storing said displacement magnitude during the stopped state of said engine.

28. An ignition timing control apparatus for an interanl combustion engine according to claim 1 wherein said ignition timing determining means includes an ignition timing operating means for phase-shifting the reference ignition timing signal in response to the output of said displacement magnitude determining means.

29. An ignition timing control apparatus for an internal combustion engine comprising:
sensing means for sensing vibrations including knocks of said engine;
knock signal deriving means for deriving knock signals from the output of said sensing means;
means for generating reference ignition timing signals;
displacement magnitude determining means for determining from an output of said knock signal deriving means a displacement magnitude for said reference ignition timing signals corresponding to the octane rating of a fuel used in said engine;
ignition timing determining means for determining ignition timing of said engine responsive to the output of said displacement magnitude determining means, said ignition timing determining means including an interpolating operation means for performing an interpolating operation between two reference ignition timing characteristics according to a proportional factor corresponding to the octane rating of said fuel.

30. An ignition timing control apparatus for an internal combustion engine comprising;
sensing means for sensing vibrations including knocks of said engine;
knock signal deriving means for deriving knock signals from the output of said sensing means and producing an output;
means for generating reference ignition timing signals;
displacement magnitude determining means for determining from an output of said knock signal deriving means a displacement magnitude for said reference ignition timing corresponding to the octane rating of a fuel used in said engine;

ignition timing determining means for determining ignition timing of said engine responsive to the output of said displacement magnitude determining means, and said ignition timing determining means including an ignition timing operating means for phase-shifting the reference ignition timing signals in response to the output of said displacement magnitude determining means.

31. An ignition timing control apparatus for an internal combustion engine comprising:

sensing means for sensing vibrations including knocks of said engine;

knock signal deriving means for deriving knock signals from the output of said sensing means;

means for generating reference ignition timing signals;

displacement magnitude determining means for determining from an output of said knock signal deriving means a displacement magnitude for said reference ignition timing corresponding to the octane rating of a fuel used in said engine;

ignition timing determining means for determining ignition timing responsive to the output of said displacement magnitude determining means; and said displacement magnitude determining means including a reset circuit for initializing the reference ignition timing to a predetermined value.

* * * * *

UNITED STATES PATENT AND TRADEMARK OFFICE
CERTIFICATE OF CORRECTION

PATENT NO. : 4,594,982

DATED : June 17, 1986

INVENTOR(S) : TAKAHASHI ET AL

It is certified that error appears in the above-identified patent and that said Letters Patent is hereby corrected as shown below:

On the title assignee should read

-- [73] Assignee: Mitsubishi Jidosha Kogyo Kabushiki Kaisha
Mitsubishi Denki Kabushiki Kaisha,
both of Tokyo, Japan --

Signed and Sealed this

Twenty-seventh Day of October, 1987

Attest:

DONALD J. QUIGG

Attesting Officer

Commissioner of Patents and Trademarks